March 17, 1970  G. C. ARNAL  3,500,798
ROTARY ENGINE

Filed March 7, 1968  7 Sheets-Sheet 1

INVENTOR
GEORGE C. ARNAL

BY Brady, O'Boyle & Gates
ATTORNEYS

INVENTOR
GEORGE C. ARNAL

ATTORNEYS

March 17, 1970

G. C. ARNAL 3,500,798

ROTARY ENGINE

Filed March 7, 1968

INVENTOR
GEORGE C. ARNAL

BY *Brady, O'Boyle & Gates*

ATTORNEYS

INVENTOR
GEORGE C. ARNAL

March 17, 1970

G. C. ARNAL 3,500,798

ROTARY ENGINE

Filed March 7, 1968

INVENTOR
GEORGE C. ARNAL

BY Brady, O'Boyle & Gates

ATTORNEYS

March 17, 1970  G. C. ARNAL  3,500,798
ROTARY ENGINE

Filed March 7, 1968  7 Sheets-Sheet 6

INVENTOR
GEORGE C. ARNAL

BY Brady, O'Boyle & Gates
ATTORNEYS

March 17, 1970 — G. C. ARNAL — 3,500,798
ROTARY ENGINE

Filed March 7, 1968 — 7 Sheets-Sheet 7

INVENTOR
GEORGE C. ARNAL

BY Brady, O'Boyle & Gates
ATTORNEYS

United States Patent Office 3,500,798
Patented Mar. 17, 1970

3,500,798
ROTARY ENGINE
George Charles Arnal, Ravenscrag,
Saskatchewan, Canada
Filed Mar. 7, 1968, Ser. No. 711,317
Int. Cl. F02b 53/00, 55/10
U.S. Cl. 123—11                                  9 Claims

ABSTRACT OF THE DISCLOSURE

A rotary engine in which two pairs of power vanes are arranged to substantially alternately travel in the same direction around a common annular chamber and about a common axis of rotation. The vanes of each pair are connected diametrically in fixed relation to each other and disposed in the chamber alternately with the vanes of the opposite pair. Upon ignition of a compressed mixture between adjacent vanes the expansion, exhaust, intake and compression cycles are simultaneously carried out between the alternately arranged vanes of opposite pairs, with succeeding engine cycles progressively carried out between consecutive pairs of the alternate vanes. The rotating power from the pairs of vanes is transferred to the crank shaft through two separate gear trains, on a drive block assembly rotatively mounted on the crank shaft, with means of reversing the action of the gear trains, whereby the reversing action of the gear trains applies power from the pairs of power vanes to rotate the crank shaft in the same direction. The gearing is such that one pair of power vanes is retained substantially stationary, with very little arcuate movement, while the other pair of power vanes, due to ignition of the compression chamber between adjacent vanes of opposite pairs, travels substantially half way around the annular chamber providing four cycles of engine operation.

BACKGROUND OF THE INVENTION

This invention relates broadly to rotary engines and more particularly to rotary internal combustion engines. Rotary engines are known in the prior art which have rotating annular rotors carrying bucket-shaped depressions upon the perimeter thereof which move into registration with a compression chamber and these operate somewhat like a turbine wheel with the expanded gases causing rotation of the rotor and at the same time causing another portion of the rotor to compress a mixture in the combustion chamber portion. Other rotary engines have provided an eccentrically arranged rotor, very similar to a pump mechanism, with the single rotor carrying out the compression, expansion, exhaust and intake cycles.

SUMMARY OF THE INVENTION

The rotary engine of the present invention departs from these known prior art types and provides an annular chamber, preferably toroidal in shape in which two pairs of vanes, in which the vanes of each pair are connected diametrically from each other, are arranged alternately in the toroidal chamber, with the vanes of each pair preferably being circular in cross section but not limited to this shape. The pairs of vanes are connected to form compression, expansion, exhaust and intake chambers therebetween, and the parts are arranged to alternately travel approximately 180° along the same annular path around the annular chamber. The engine also includes a novel gearing reversing mechanism which enables one pair of vanes to be held substantially stationary in the annular chamber to provide, for instance, a stationary end wall for a combustion chamber, while allowing the other pair of vanes to be freely rotated under the force of the expanding combustion gases. One vane which is rotating under the force of the expanding gases is simultaneously forcing the expanded gases from the previous cycle between the other side of the vane and one of the stationary vanes through an exhaust port, thus simultaneously providing an exhaust cycle. The other moving vane connected diametrically thereto is simultaneously moving relative to one of the stationary vanes and drawing in a combustible mixture into the expanding chamber between the two mentioned vanes, the opposite face of the last mentioned moving vane is simultaneously compressing a combustible mixture in a chamber portion between the moving vane and the opposite stationary vane. This moving vane thus carries out the intake and compression cycles of the engine simultaneously while its companion vane carries out its expansion and exhaust cycles of the engine.

The annular chamber is disposed coaxially with the crank shaft and the pairs of vanes are connected to individual circular body portions disposed in side-by-side relation and having integral hollow shaft extensions coaxially journaled about the crank shaft to allow the pairs of vanes to freely rotate relative to each other about the crank shaft.

The circular body portions are provided with edge portions with sealing means, which edge portions extend through an annular slot in the wall of the annular chamber in order to make connection with the pairs of vanes and at the same time seal the wall of the annular chamber.

Planetary gearing means including a gear connected stationary with the engine block and a gear connected on the crank shaft, as well as a frame journaled on the crank shaft and carrying planetary gears journaled thereon in mesh with the stationary and crank shaft gears, is connected interior of the engine block to rotate relative thereto under action of the crank shaft.

A pair of reversible crank gear trains are journaled on the frame on the opposite side of the crank shaft from the planetary gears and are connected to the crank portion of the crank shaft so that both gear trains tend to rotate the crank shaft in the same direction. Each crank gear train is connected for movement by its associated pair of vanes by hollow shaft gears meshed therewith and connected with the hollow shaft extensions of the circular body portions carrying the vanes. As one pair of vanes rotate to rotate the crank shaft the frame member rotates to hold the other pair of vanes substantially stationary which also creates a thrust through the associated crank gear train to rotate the crank shaft.

DESCRIPTION OF THE PREFERRED EMBODIMENT

Referring to the drawings in greater detail, the block of the internal combustion engine, according to the invention, is comprised of head portions 1 and 2 secured together by bolts 3, or the like, and having formed therein opposite mating halves of the annular or toroidal chamber 4. The toroidal chamber 4 comprises the compression chamber of the engine and is comparable to the cylinder bore in the usual type internal combustion engine. While it is shown as being circular in cross section in the embodiment shown, it is to be understood that it may have a cross section of a different shape, as long as the piston members, to be explained, are of a corresponding shape. The head portions 1 and 2 are provided with liquid cooling passages 5 in the usual manner and if desired air-cooling fins, not shown, may also be formed on the outside of the head portions.

Figures 2, 5:
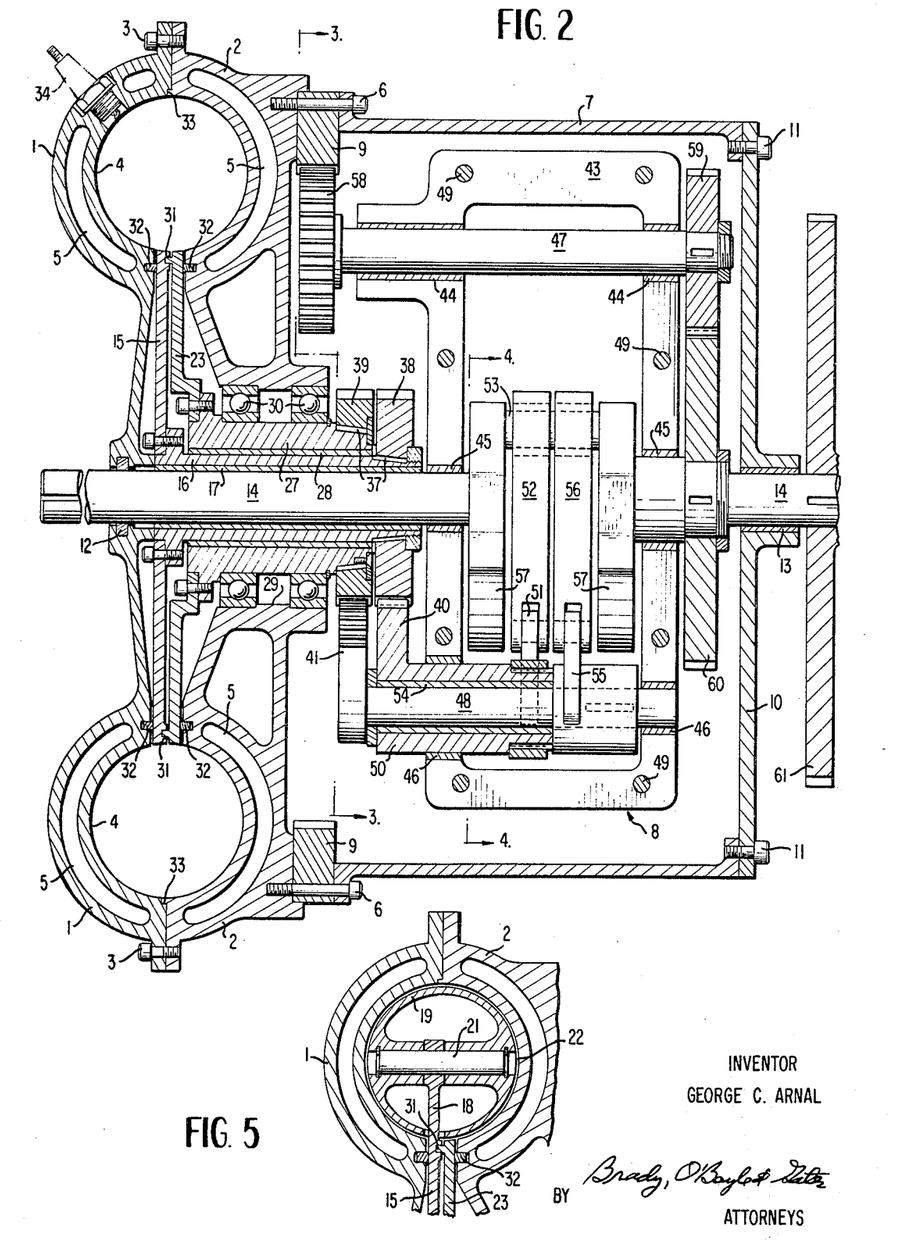
FIG. 2 is a transverse sectional view taken along line 2—2 of FIG. 1.
FIG. 5 is a fragmentary cross sectional view, showing the piston construction, taken substantially along line 5—5 of FIG. 1, the figure being located with FIG. 2.
Figure 3:
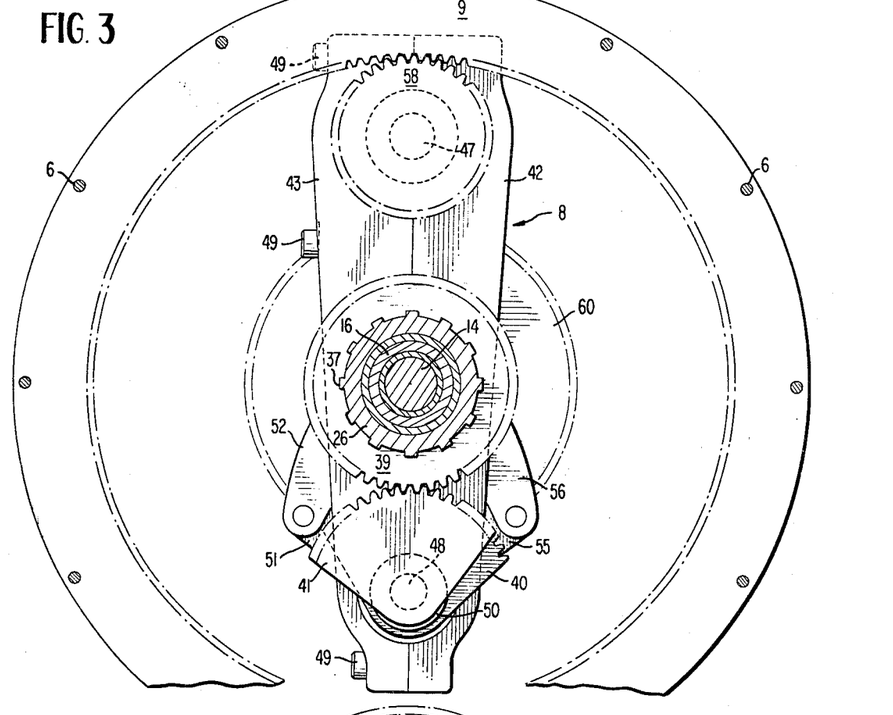
FIG. 3 is a partial cross-sectional view taken along line 3—3 of FIG. 2, and showing an end view of the drive block assembly.
Figure 4:
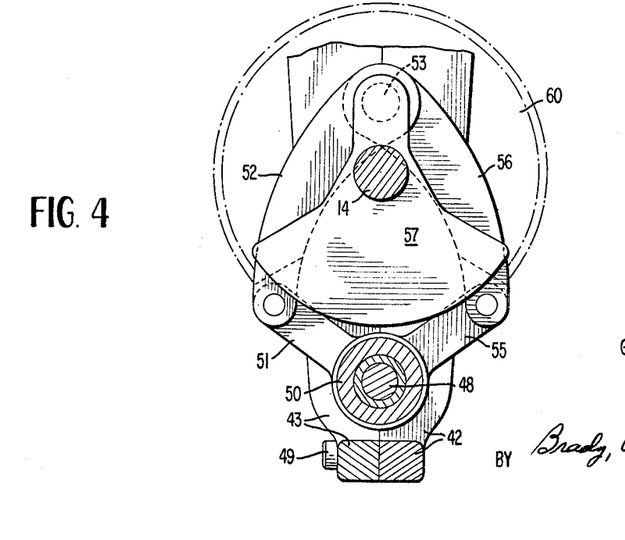
FIG. 4 is a partial cross-sectional view through a fragmentary portion of the drive block assembly, taken along line 4—4 of FIG. 2.

Head portion 2 is bolted at 6 to main block housing 7, which is preferably cylindrical in cross section, but which may be of any desired shape to accommodate the operation of drive block assembly 8 and a quantity of oil in the lower part of said housing, as seen in FIG. 3, which serves as an oil pan portion. Cooling fins and/or cooling passages, not shown, may be formed on housing 7 in the normal manner, if desired. Ring gear 9 having gear teeth formed on its inner diameter is connected in stationary relation with the engine block, such as by means of bolts 6, FIG. 2, which also connect housing 7 and head portion 2. It is understood that oil seals are provided where necessary to maintain an oil-tight structure. The end of main block housing 7 is closed by plate portion 10 secured thereto by bolts 11. Plate portion 10 and head portion 2 are centrally apertured and support bearings 12 and 13 in said apertures which support opposite ends of crank shaft 14 extending therethrough.

Figures 1, 6:
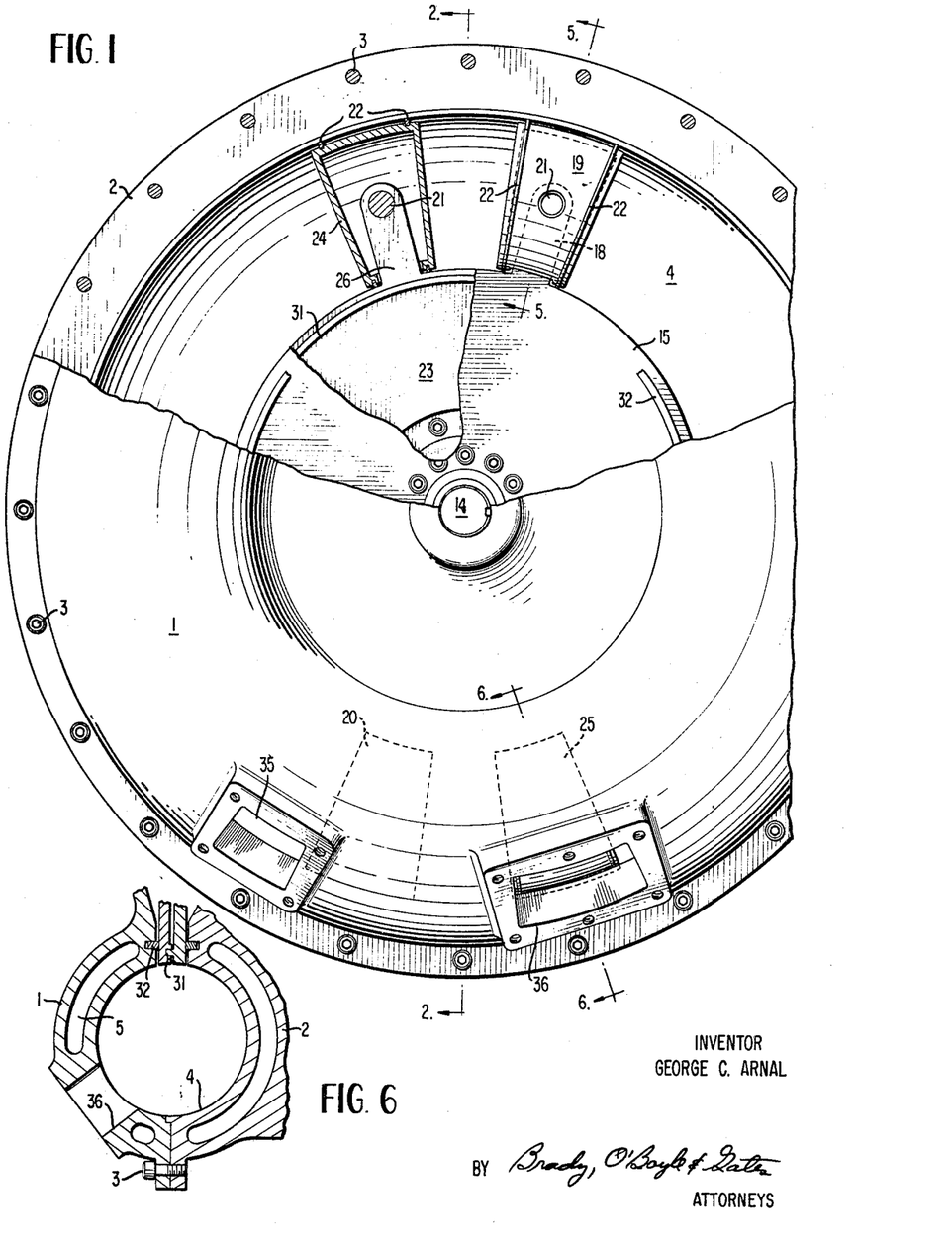
FIG. 1 is a front elevational view of the rotary engine of the invention, with parts broken away to more clearly show the arrangement of the power vane assemblies.
FIG. 6, located with FIG. 1, is a fragmentary cross-sectional view through the exhaust port and toroidal chamber taken substantially along line 6—6 of FIG. 1.

A pair of power vane assemblies are connected for rotation about one end of crank shaft 14. The first power vane assembly is comprised of circular plate 15 having a central aperture rigidly connected in registration with hollow shaft 16 fitted over the end of crank shaft 14 and connected for rotation thereon by means of bearing 17, such as a sleeve bearing or the like, formed of bronze or other suitable bearing material. A pair of diametrically spaced struts 18 are integrally formed on the outer periphery of circular plate 15 and a pair of vanes 19 and 20 are pivotally connected thereto by pins 21, such that the first power vane assembly consists of members 15, 16, 18, 19, 20 and 21 and rotates as a unit about crank shaft 14. The vanes are similar to piston heads but do not reciprocate within the annular chamber 4, but rather travel in a clockwise direction around the chamber. The vanes are made of cast alloy or die-cast aluminum alloy, and since in the example illustrated annular chamber 4 is shown as circular in cross section, the vanes on opposite sides of plate 15 are also circular in cross section and of a diameter slightly less than the diameter of chamber 4. Referring to FIG. 1, it will be noted that the vanes when viewed from the side are somewhat arcuate in side profile. Each vane is provided with two face portions with compression and oil rings 22 disposed about the outer perimeter of the vanes adjacent each face portion, and extending into sliding contact with the honed surface of annular chamber 4.

A second power vane assembly, consisting of apertured circular plate 23, having vanes 24 and 25 pivotally connected by pins 21 to struts 26 on diametrically opposite sides of the plate, which plate 23 adjacent its central aperture is rigidly connected to hollow shaft 27 which has a greater diameter than hollow shaft 16, is connected for rotation about shaft 16 on bearing 28, such as a bronze sleeve bearing or the like. Block head portion 2 is provided with a central bore 29 through which crank shaft 14 and the concentrically disposed hollow shafts 16 and 17, and their associated sleeve bearings extend and are rotatably supported therein by bearings 30 connected in bore 29 between members 2 and 27. From FIG. 2 it will be seen that circular plates 15 and 23 are disposed in side-by-side relation, and by observing FIG. 5, it will be noted that the vanes connected to the struts extending from the edges of the plate are connected in opposite offset relation so that the vanes 19, 20 and 24, 25 are connected to travel in the same annular chamber and are disposed to travel along a common annular axis during operation of the engine. The vanes 19, 20 and 24, 25 may, if desired, be welded to their respective struts since they always travel in the same arcuate path having a constant radius of rotation throughout.

Circular plates 15 and 23 are provided with slidably interfitting circular-faced surfaces, indicated generally at 31, extending between the plates adjacent the outer peripheries thereof to form a compression seal therebetween since the edges of these plates close a slot extending around the bottom of annular chamber 4. The surfaces of plates 15 and 23 facing toward the respective head portions 1 and 2 are accurately faced, at least adjacent the outer edge portions thereof, and are disposed in sliding abutment with compression rings 32 disposed in slots in head portions 1 and 2, just below chamber 4, completing the compression sealing of the chamber. The honed mating surfaces of the head portions 1 and 2, disposed diametrically of annular chamber 4 from sealing rings and sealing members 32 and 31, are also provided with an interfitting seal 33.

Figure 7A:
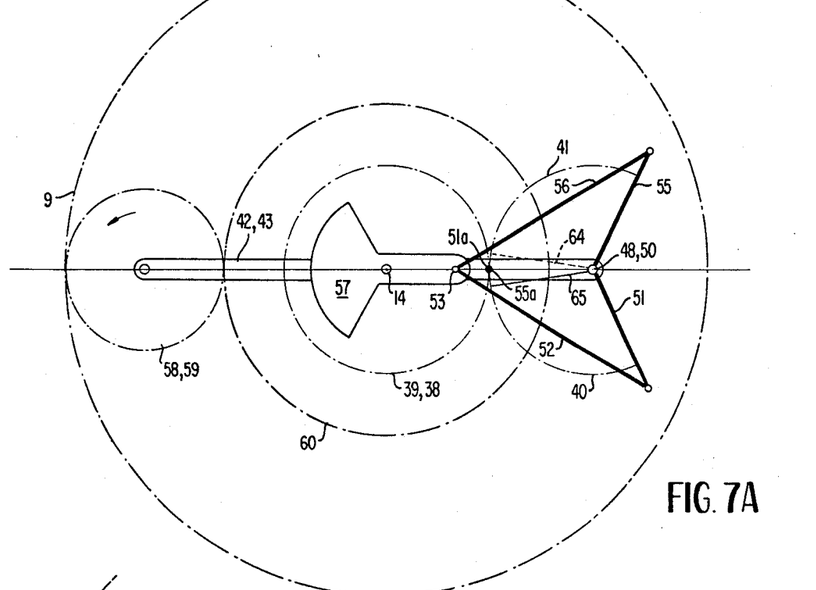
FIGS. 7A, 8A, 9A, 10A and 11A are schematic views corresponding to the detailed views of FIGS. 3 and 4, schematically illustrating the progressive position of the various engine components of the drive block assembly, etc,. through one-quarter of a revolution thereof.
Figures 7B, 8B:
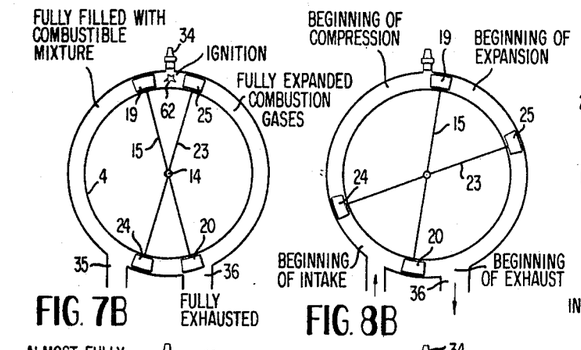
FIGS. 7B, 8B, 9B, 10B and 11B, located with FIG. 11A, are schematic illustrations on a reduced scale, showing the phasing and relative positions of the power vane assemblies corresponding to the positions of the drive block assembly in FIGS. 7A–11A, respectively, through one complete cycle of the engine.

An ignition device such as a spark plug 34 is connected through the wall of head portion 1 in communication with the top of the annular chamber and at positions substantially diametrically thereto an intake port 35 disposed in spaced relation with an exhaust port 36, are each provided through the side wall of head portion 1, FIGS. 1, 6, 7B, in communication with chamber 4. Although not shown, a carburetion device of the usual type is connected to intake port 35 to provide a fuel-air mixture to the chamber 4, during the intake cycle of the engine, and a distributor circuit connected with an ignition circuit for supplying timed ignition signals to the spark plug 34. It is understood that the engine is provided with all necessary associated devices to provide a workable internal combustion engine.

Components of the front portion of the rotary engine of the invention can all be easily disassembled and removed by first removing bolts 3 to remove head portion 1 which also comprises the front seal and bearing cover for the engine. The first vane assembly 15, 16, 18, 19, 20, can then be removed by pulling it forwardly and slipping it off of crank shaft 14 after removing hollow shaft gear 38 connected to the opposite end thereof. The second vane assembly 23, 27, 26, 24, 25 can then be removed from the engine by slipping it forwardly off of crank shaft 14, after removing hollow shaft gear 39 from the opposite end thereof. The two power vane assemblies can actually be removed from the engine together.

Hollow shaft gears 38 and 39, respectively, rigidly connected to hollow shafts 16 and 27 by means of tapered splines 37 and the like, and recessed bolts and/or tapered nuts, are connected in meshing relation with rocker gears 40 and 41 respectively. These rocker gears are part of drive block assembly 8. Drive block assembly 8 comprises the means by which the rotative power is transferred from the power vane assemblies, including vanes 19, 20 and 24, 25, to the crank shaft 14, and is comprised about a main rigid frame member constituting two generally rectangular drive frame portions 42 and 43, each having three sets of recessed bearing halves formed therein into which bearing shells 44, 45 and 46 are removably connected to rotatively support countershaft 47, crank shaft 14 and rocker shafts 48 and 50, respectively. The drive frame portions 42 and 43 are secured together by bolts 49 forming a rigid frame structure constructed of suitable material to withstand the stress and strain of the drive forces from the gears and crank shaft, and with the described bolting arrangement allows for ease of maintenance because only bolts 49 have to be removed for changing the various bearings, shafts and gears associated with the drive block assembly. The two drive frame portions 42, 43 as well as the shaft and gears carried thereby are balanced to avoid vibration of the assembly as a unit, and the other moving parts are also balanced where necessary, according to usual practice. Although not previously mentioned, and not shown in the drawings, a full-pressure lubrication system is provided throughout the engine, according to standard engine practice, including lubrication passages through plates 15 and 23 to the vane pivot bearings and to the shaft bearings 17, 28 and 30. Oil passages are also provided to all of the crank shaft bearings and through drive frame portions 42 and 43 to the bearings of the rocker shafts and countershaft, etc.

Rocker gear 40 is integrally connected on one end of hollow rocker shaft 50 rotatively connected in bearing 46 on frame portions 42 and 43 and a crank arm 51 is rigidly connected to the opposite end thereof, and extends outwardly to one side of the shaft relative to the symmetry axis of gear 40. A connecting rod 52 is pivotally connected between the terminal end of crank arm 51 and crank pin 53 of crank shaft 14. In like manner rocker gear 41 is rigidly connected to one end of rocker shaft 48, which extends centrally through the bore of hollow rocker shaft 50, and is rotatively supported therein by sleeve bearing 54 or the like, and a crank arm 55 is rigidly connected to the opposite end thereof by means of splines or the like. Crank arm 55 extends outwardly from shaft 48 in annular relation to the symmetry axis of rocker gear 41 such that when gears 40 and 41 are substantially aligned as shown in FIG. 3, the crank arms 51 and 55 diverge from each other. Connecting rod 56 is pivotally connected between the terminal end of crank arm 55 and crank pin 53. The crank shaft 14 is provided with the normal crank shaft counterbalance weights 57 extending oppositely from opposite ends of crank pin 53. The connecting rods 56 and 52 are thus connected so that they diverge outwardly from crank pin 53, and the diverging crank arms 51 and 55 are connected so that they are substantially in alignment with opposite edges of their respective rocker gears 40 and 55 which are in the form of segment gears, as shown in FIG. 3. In other words, referring to FIG. 3, the right terminating edge of gear 41 is disposed in substantial alignment with its axis of the corresponding crank arm 55 and the left terminating edge of gear 40 is disposed in substantial alignment with the axis of crank arm 51. This arrangement of parts allows power to be transmitted from the power vane assemblies to the rocker gear and shaft assemblies to both sides of the crank pin of the crank shaft to transmit power therefrom to rotate the crank shaft in the same direction. Countershaft 47 is rotatively journaled in frame portions 42 and 43 on the opposite side of crank shaft 14 from rocker shafts 48 and 50. Pinion gear 58 is connected to the forward terminal end of countershaft 47 and pinion gear 59 is connected to the opposite terminal end thereof, both gears being disposed outwardly of the drive frame portions. Gear 58 is disposed in meshing relation with stationary ring gear 9 of the motor block and pinion gear 59 is disposed in meshing relation with crank shaft gear 60 which is rigidly connected to the crank shaft. These gears represent a compound planetary gear arrangement in which gear 9 is a stationary gear and gear 60 represents a sun gear connected to the stationary internal gear by the compound planetary gear 59, 58. A fly wheel 61 is connected to the crank shaft outwardly of the block housing and a clutch mechanism, transmission, etc., may also be connected to the crank shaft in the usual manner.

The sizes of annular chamber 4 and the diameter of vanes 19, 20, 24 and 25 are determined by the horsepower requirements of the engine. In the example shown in the drawings, which are to a one-third scale, the ratio of gears 58 and 9 is 4:1, the ratio of gears 58 and 59 is 1:1 and the ratio of gears 59 and 60 is 2:1. Gears 38 and 39 are identical in size and each has a 1:1 ratio with the respective rocker gears 40 and 41, which are also the same in size. It is to be understood that these gear ratios represent only one combination of gear ratios which are operative in the engine of the invention, as the engine may also be designed to operate with different combinations of gear ratios. The sizes of the engine components will vary according to horsepower requirements. The components in FIGS. 1-4 are shown in the positions illustrated schematically in FIGS. 11A, 11B.

Rferring to FIGS. 7A-12A and FIGS. 7B-15, two complete cyclic operations of the engine comprising substantially four engine cycles each, namely, an expansion, exhaust, intake, and compression cycle will now be described, starting with the vanes in the positions shown in FIG. 7B and the remainder of the engine components shown in the positions illustrated in FIG. 7A. The pairs of vanes 25, 24 and 19, 20 always rotate in a clockwise direction and in the position shown in FIG. 7B, the vanes are shown in the start of an expansion cycle, that is, in the firing position, where the compressed mixture between vanes 19 and 25 is ignited as indicated at 62 by spark plug 34. Throughout the following description it should be kept in mind that the firing order of the vanes is as follows, where the first number represents the nonmoving vane and the second number represents the moving vane—19-25; 24-19; 20-24 and 25-20. In FIG. 7B vane 20 has just completed its expansion stroke and chamber 4 between vanes 20 and 25 is filled with fully expanded combustion gases from the previous cycle and vane 20 has just completed exhausting the expanded gasses between the vanes 20 and 24. At the same time in its clockwise travel vane 19 has just completed its intake stroke and compression stroke compressing the mixture between vanes 19 and 25 and drawing in a combustible mixture into the chamber between vanes 19 and 24. Referring to FIG. 7A, at this time crank arms 51 and 55 connected respectively with vanes 19, 20 and 25, 24 are disposed at one maximum limit of their travel, having the greatest spread relative to each other, and crank pin 53 of the crank shaft is disposed in alignment with shafts 14, 48, 50 and in the closest position to shafts 48 and 50 that it can assume. To get to the position shown, rocker gear 41 and crank arm 55 have rotated to the limit of their clockwise movement, and rocker gear 40 and crank arm 51 have simultaneously rotated to their maximum counterclockwise movement. Crank arm 51 is connected with rocker gear 40, the extremities of which are shown by the said crank arm and line 64. Crank arm 55 is connected with rocker gear 51, the extremities of which are shown bounded by the said crank arm and line 65. The points of contact between gears 39, 41 and 38, 40 are shown superimposed at 55a and 51a, respectively.

Figure 8A:
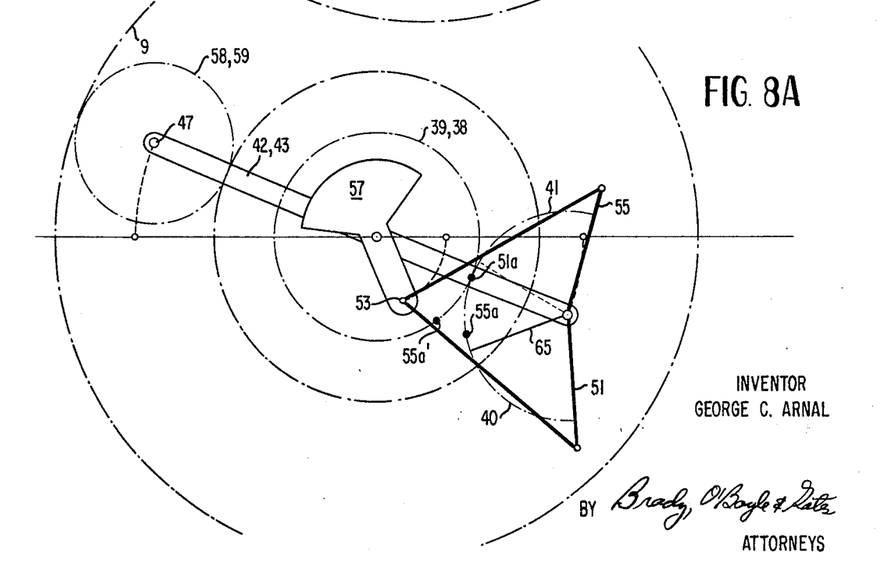
Figure 9A:
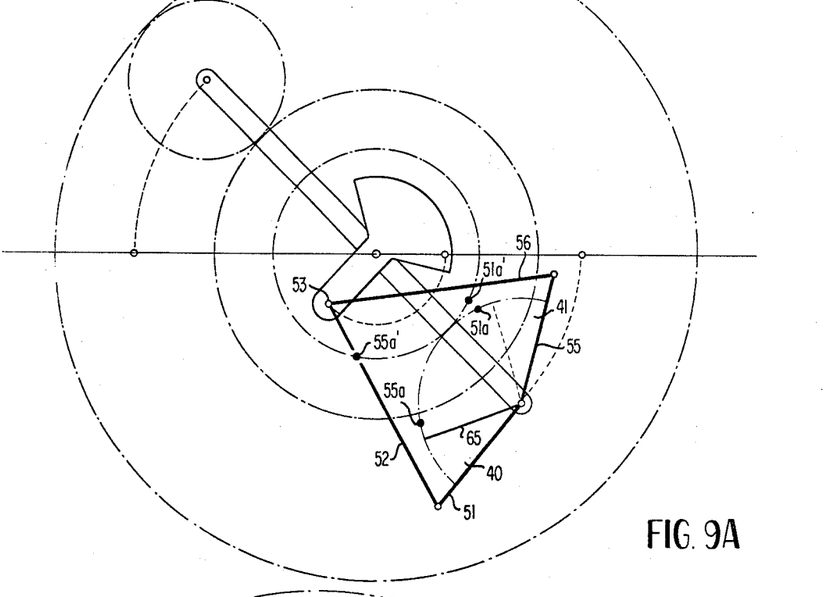
Figure 9B:
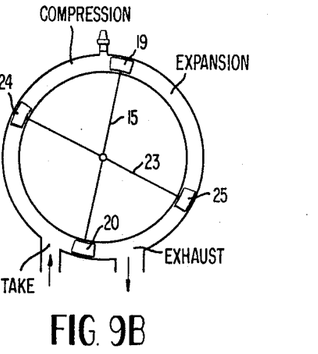
Figure 10A:
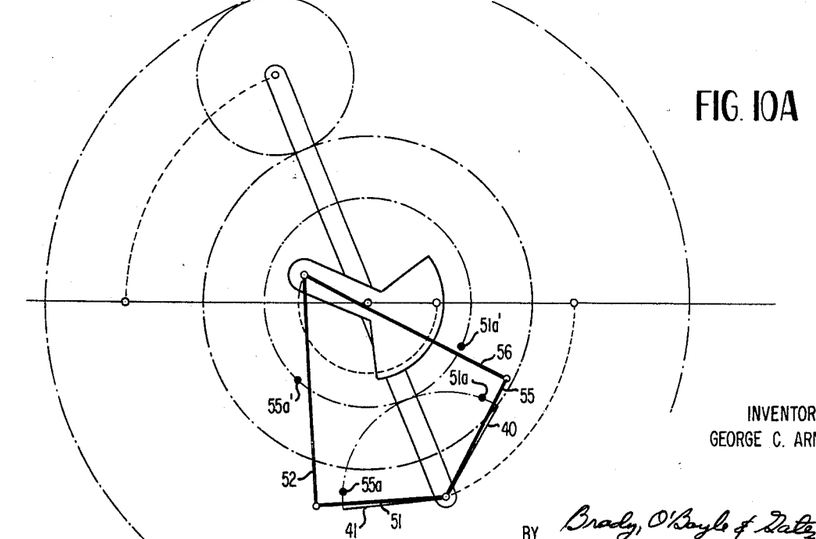
Figure 10B:
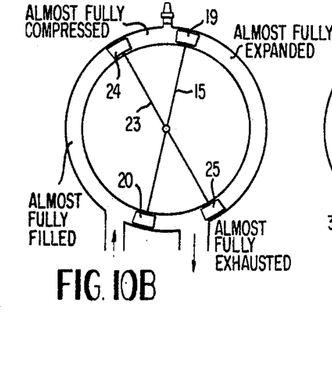
Figure 11A:
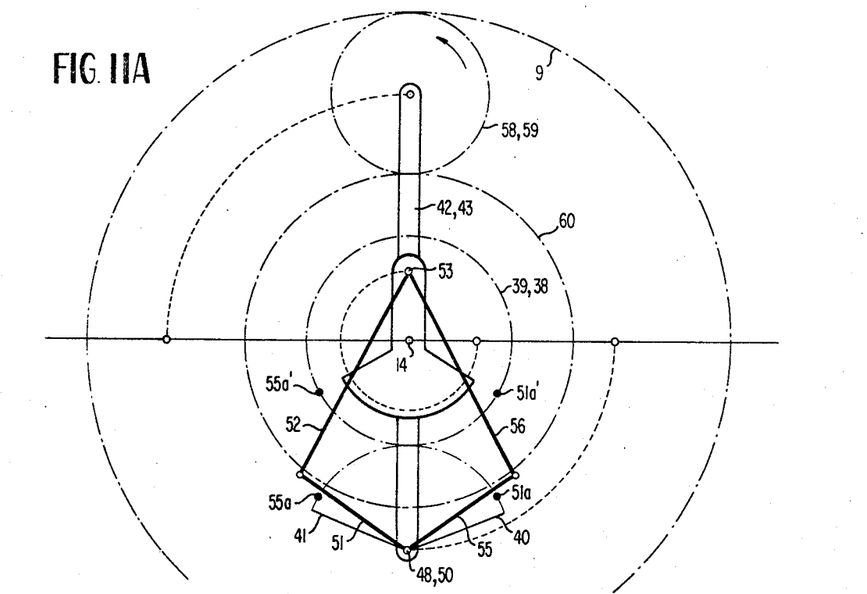

Upon ignition 62, vanes 19 and 25 have a tendency to move away from each other but since rocker gear 40, connected with vanes 19, 20 is in the extremity of its movement and has turned in the opposite direction from rocker gear 41 connected with vanes 24, 25 and with the drive frame 42, 43 rotating in a clockwise direction, FIG. 8, the rocker gear 40 through its linkage holds the power vane assembly 15, 19, 20 in the same position due to advancement of frame 42, 43. The crank shaft 14 and its associated crank shaft gear 60 are being rotated clockwise, causing gears 59 and 58 to rotate counterclockwise, and due to gear 58 meshing with stationary internal ring gear 9, the shaft 47 of gears 58 and 59 and thus the drive frame portions 42, 43 travel in a clockwise direction about the main black housing. As the crank shaft and crank pin 53 rotate in a clockwise direction, a thrust is developed from rocker gear 40 and crank arm 51 through the drive block assembly frame portions 42, 43 through the gears 58, 9, to the main block housing to hold vanes 19, 20 substantially stationary. As vane 25 moves in a clockwise direction due to the force of the expanding gases, as shown in FIGS. 8B, 9B and 10B, hollow shaft gear 39 connected therewith rotates in a clockwise direction rotating rocker gear 41 and crank arm 55 in a counterclockwise direction, FIGS. 8A, 9A, 10A, rotating crank pin 53 clockwise by means of connecting rod 56. The relative rotation between gears 39 and 41 in FIGS. 8A–12A is indicated by the movement of points 55a' and 55a respectively on the gears, which represent the superimposed original points of contact between the gears at 55a in FIG. 7A. Crank arm 55 continues to rotate counterclockwise as seen in FIGS. 8A–11A as vane 25 continues to be rotated clockwise by the expanding gases as shown in FIGS. 8B–11B, rotating crank shaft 14 in a clockwise direction. This movement and the clockwise movement of the drive frame 42, 43 causes crank arm 51 and the associated rocker gear 40 to remain substantially in the same limit of travel as shown in FIG. 7A, but since drive frame 42, 43 is rotating clockwise, FIG. 8A, gear 38 meshed with gear 40 moves vanes 19, 20 a short distance in a clockwise direction as shown in FIG. 8B causing vane 20 to uncover exhaust port 36 and allowing vane 25 during the expansion cycle to exhaust the gases between vanes 25 and 20. In FIG. 8A, although gear 38 has rotated clockwise, the initial point 51a between this gear and gear 40 remains the same. Further rotation of the crank shaft by crank arm 55, which in turn causes further clockwise rotation of drive block assembly frame 42, 43, FIGS. 9A–11A causes the initial contact points 55a, 55a' between gears 39 and 41 to move further apart, and the clockwise advancement of the frame causes the initial contact point 51a and 51a' on gears 40 and 38 to move further from each other, but at a much slower rate. During this stage of movement it will be noted that rocker gears 41 and 42 and their respective crank arms 55 and 51 are rotated in opposite directions, that is members 41, 55 are rotating in a counterclockwise direction and members 40, 51 are rotating in a clockwise direction and continue such rotation until they arrive at the opposite limit of their travel, as indicated in FIG. 11A, from the travel limit shown in FIG. 7A. At this point the crank shaft 14 has completed three-quarters of a revolution, drive block assembly 42, 43 has completed one-quarter revolution, gear 58, 59 has completed one revolution. The paths of travel of the various shafts in the drive block assembly and on the crank shaft are shown in dotted lines throughout the drawings.

Figure 11B:
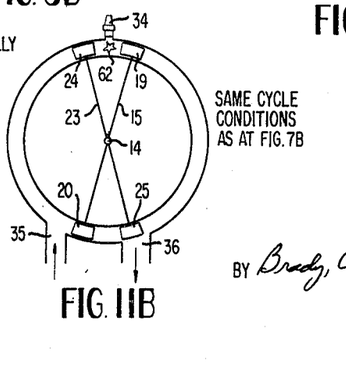

While vane 25 has been rotating clockwise under the expanding force of gases and has been exhausting the gases from the previous cycle through exhaust port 36, vane 24 on the opposite end of plate 23, has been compressing the combustible mixture in chamber 4 between vanes 24 and 19 and simultaneously has been drawing a combustible mixture into chamber 4 between vanes 24 and 20 so that in FIG. 10B the chamber space between vanes 20 and 24 is almost completely filled with a combustible mixture, the mixture in the space between vanes 24 and 19 is almost fully compressed, the gases between 19 and 25 are almost fully expanded, and the gases in the chamber between vanes 20 and 25 are almost fully exhausted so that when the vanes reach the position shown in FIG. 11B the same cycle conditions exist as in FIG. 7B.

Figure 12A:
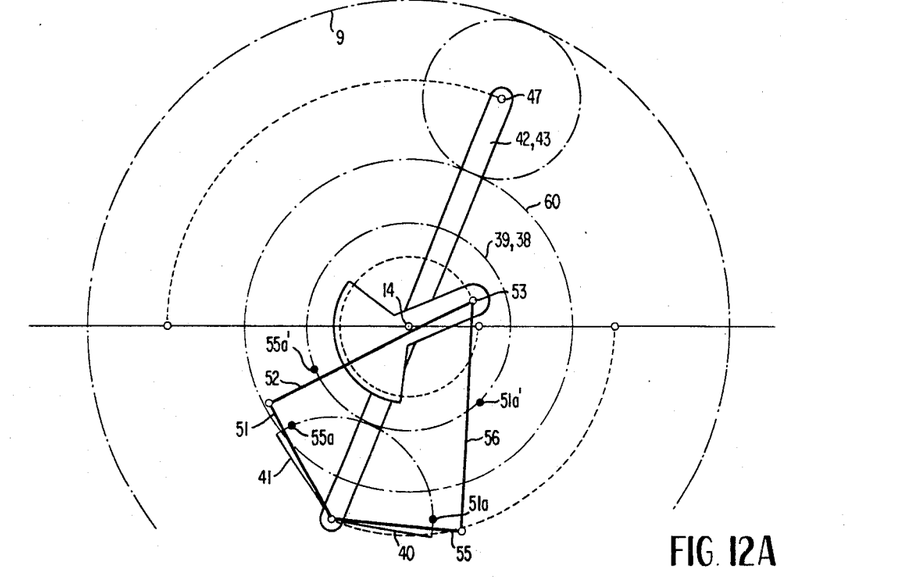
FIG. 12A is a schematic illustration similar to FIGS. 7A–11A, and showing the position of the components at the start of the succeeding expansion cycle.
Figures 12B, 14:
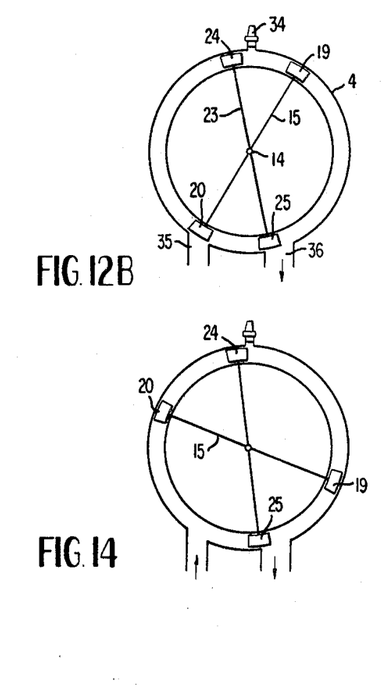
FIG. 12B is a schematic illustration on a reduced scale similar to FIGS. 7B–11B, and showing the phasing and relative positions of the power vane assemblies, corresponding to the position of the drive block assembly in FIG. 12A.
FIGS. 13, 14 and 15 are schematic illustrations similar to FIG. 12B, progressively showing the relative positions of the power vane assemblies through the remainder of the second cycle.
Figures 13, 15:
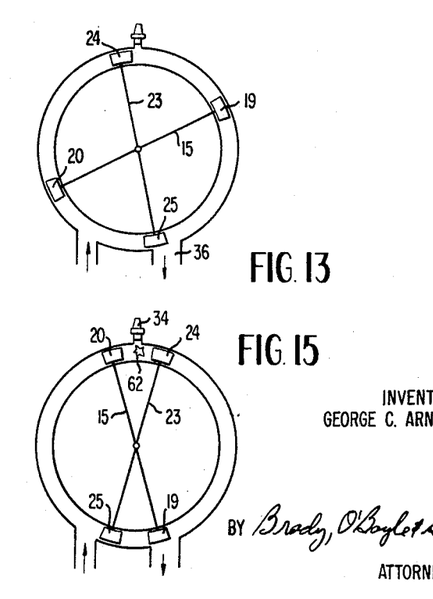

Another ignition occurs at 62 between vanes 19 and 24 in FIG. 11B, and as shown in FIGS. 12B, 13, 14 and 15 vane assembly 19, 21, 15, 20 and 27 rotates clockwise in annular chamber 4 under the force of the expanding gases between vanes 19 and 24 and simultaneously exhausts the gases from the previous ignition between vanes 19, 25, compresses the combustible mixture in the chamber between vanes 20, 24 and simultaneously draws into the chamber, through intake 35 between vanes 20, 25, a fresh combustible charge. The vanes rotate until they assume the positions shown in FIG. 15 which corresponds to the positions shown in FIG. 11B and 7B at which a third ignition 62 occurs between vanes 20, 24, such that the cycle shown in FIGS. 7A, 7B–11A, 11B is repeated. Referrring to FIGS. 11A, 11B, 12A, 12B, these figures show that the movement of rocker gears 40, 41 and their associated crank arms is now reversed from the movement previously described. Vane 19 under the force of the expanding gases in the combustion chamber now rotates hollow shaft gear 38 in a clockwise direction which in turn rotates rocker gear 40 in a counterclockwise direction causing crank arm 51 to rotate in a counterclockwise direction and pull crank shaft 14 through crank pin 53 in a clockwise direction. This rotation rotates drive frame assembly 42, 43 in a clockwise direction, as previously explained, causing a backward thrust in the gear train 39, 41, 55, 56 to hold vanes 24, 25 substantially stationary, FIGS. 12B–14. The rotating crank shaft through connecting rod 56 has a tendency to move crank arm 55 in a clockwise direction, and also rocker gear 41 connected therewith, but this movement is substantially nullified by the clockwise rotation of drive block frame 42, 43, such that gear 41 prevents rotation of hollow shaft gear 39 and therefore retains vanes 24 and 25 connected therewith in substantially the same positions as when the cycle started. FIG. 12A is a mirror image of FIG. 10A and the succeeding positions of the elements shown in FIG. 12A corresponding to the vane positions of FIGS. 13, 14 and 15 are mirror images of FIGS. 9A, 8A and 7A, respectively.

The movement of the vanes is somewhat different between succeeding cyclic movements thereof but alternate movements of the vanes are identical. For instance in FIGS. 7B–10B it will be noted that the vane 19, 20 which remains substantially stationary, moves very quickly at the beginning of the cycle, a small amount to the position shown in FIG. 8B and remains substantially in the same position throughout the remainder of the cycle. Referring to the successive cyclic movement in FIGS. 11B, 12B, 13, 14 and 15, it will be noted that the vane 24, 25 that remains substantially stationary throughout the cycle, stays in substantially the same position throughout the entire cycle as it was at the start of the cycle, and moves very quickly in a small clockwise arc, FIG. 15, at the very end of the cycle. In the next succeeding cycle the stationary vane operates as described with respect to FIGS. 7B–10B. This difference in movement of the stationary vane assembly is caused by the fact that the rocker gears 40, 41 operate in the reverse direction in succeeding cycles so that movements of members caused by this gearing at the beginning of a cycle occurs at the end of the succeeding cycle because of the reverse movement of the gears.

It is to be understood that the power vane assembly 19, 20 or 24, 25 in the two complete cycles of operation described, which are the stationary vanes in the respective cycles, and which are prevented from rotating counterclockwise are also producing power for the crank shaft because the gears associated with the stationary vane assembly are reversing and by the back thrust to the engine block are applying power in the same direction of rotation to the crank shaft.

In operation, four cycles of engine operation occur for approximately each one-half revolution of the crank shaft. In schematic drawings 7A-11A one-quarter revolution of the drive block frame assembly 42, 43 has been shown with gears 58, 59 making one full revolution while traveling around gear 9. When gear 58 makes one full circuit of ring gear 9 it will have turned four revolutions and the drive block frame 42, 43 will have turned one revolution. In the meantime, gear 60 has turned two revolutions relative to gear 59, meaning that crank shaft 14 has turned three full revolutions for the one revolution of the drive block frame assembly. During this time four ignitions have occurred so that an expansion and ignition cycle occurs at the beginning of each quarter revolution of the drive frame assembly and every three-quarters revolution of the crank shaft.

The embodiments of the invention in which an exclusive property or privilege is claimed are defined as follows:

1. A rotary internal combustion machine comprising, an outer stationary body having a substantially closed annular chamber; ignition means, exhaust port means, and intake means for supplying a combustible mixture, connected in communication with said annular chamber and circumferentially spaced from each other; a driven crank shaft for providing power including a crank portion, journaled for rotation on said outer stationary body coaxial with said annular chamber; first and second body portions journaled for independent rotation on said crank shaft and having edge portions closing one wall of said annular chamber; first and second pairs of vane means connected alternately in said annular chamber and connected diametrically on said edge portions of said first and second body portions, respectively, for movement in the same direction in an annular path through said chamber; said alternate first and second pairs of vane means forming end walls of compression, expansion, exhaust, and intake chamber portions in said annular chamber; planetary gearing means connected between said outer stationary body and said crank shaft; said planetary gearing means including a drive frame means mounted for rotation on and about said crank shaft; and reversible crank gearing means journaled on said drive frame means offset from said crank shaft and connected to said crank portions and connected to transfer rotative power from said first and second body portions to said crank portion to rotate said crank shaft and alternately hold one pair of said vane means substantially stationary while the other pair of vane means is moved around said annular chamber to provide four cycle operations upon ignition of said compression chamber portion by said ignition means.

2. A rotary internal combustion machine as set forth in claim 1 in which said first and second body portions each includes a circular plate member, and said circular plate members connected in side-by-side relation.

3. A rotary internal combustion machine as set forth in claim 2, including compression seal means connected between said circular plate members.

4. A rotary internal combustion machine as set forth in claim 1 in which said substantially closed annular chamber includes a continuous annular slot in said stationary body through one wall of the chamber, said edge portions of said first and second body portions extending into said annular slot, and rotary seal means connected between said body portions and between said stationary body and said body portions to close said annular chamber.

5. A rotary internal combustion machine as set forth in claim 1 in which said planetary gearing means also includes a stationary gear connected to said outer stationary body, a crank shaft gear connected to said crank shaft for rotation therewith, a shaft journaled on said drive frame means on the opposite side of said crank shaft from said reversible crank gearing means, and pinion gearing connected on said shaft meshed with said stationary gear and said crank shaft gear, whereby said drive frame is rotated by said crank shaft in the same direction therewith but at a different speed than the drive shaft.

6. A rotary internal combustion machine comprising, an outer stationary body having a substantially closed annular chamber; ignition means, exhaust port means, and intake means for supplying a combustible mixture, connected in communication with said annular chamber and circumferentially spaced from each other; a crank shaft for providing power including a crank portion, journaled for rotation on said outer stationary body coaxial with said annular chamber; first and second body portions journaled for independent rotation on said crank shaft and having edge portions closing one wall of said annular chamber; first and second pairs of vane means connected alternately in said annular chamber and connected diametrically on said edge portions of said first and second body portions, respectively, for movement in the same direction in an annular path through said chamber; said alternate first and second pairs of vane means forming end walls of compression, expansion, exhaust, and intake chamber portions in said annular chamber; planetary gearing means connected between said outer stationary body and said crank shaft; said planetary gearing means including a drive frame means mounted for rotation on and about said crank shaft; reversible crank gearing means journaled on said drive frame means offset from said crank shaft and connected to transfer rotative power from said first and second body portions to said crank portion to rotate said crank shaft and alternately hold one pair of said vane means substantially stationary while the other pair of vane means is moved around said annular chamber to provide four cycle operations upon ignition of said compression chamber portion by said ignition means; and said planetary gearing means also including a stationary internal ring gear connected to said outer stationary body, a crank shaft gear connected to said crank shaft for rotation therewith, a shaft journaled on said drive frame means on the opposite side of said crank shaft from said reversible crank gearing means, and pinion gearing connected on said shaft meshed with said stationary internal ring gear and said crank shaft gear, whereby said drive frame is rotated by said crank shaft in the same direction therewith but at a different speed than the drive shaft.

7. A rotary internal combustion machine comprising, an outer stationary body having a substantially closed annular chamber; ignition means, exhaust port means, and intake means for supplying a combustible mixture, connected in communication with said annular chamber and circumferentially spaced from each other; a driven crank shaft for providing power including a crank portion, journaled for rotation on said outer stationary body coaxial with said annular chamber; first and second body portions journaled for independent rotation on said crank shaft and having edge portions closing one wall of said annular chamber; first and second pairs of vane means connected alternately in said annular chamber and connected diametrically on said edge portions of said first and second body portions, respectively, for movement in the same direction in an annular path through said chamber; said alternate first and second pairs of vane means forming end walls of compression, expansion, exhaust, and intake chamber portions in said annular chamber; planetary gearing means connected between said outer stationary body and said crank shaft; said planetary gearing means including a drive frame means mounted for rotation on and about said crank shaft; reversible crank gearing means journaled on said drive frame means offset from said crank shaft and connected to transfer rotative power from said first and second body portions to said crank portion to rotate said crank shaft and alternately hold one pair of said vane means substantially stationary while the other pair of vane means is moved around said annular chamber to provide four cycle operations upon ignition of said compression chamber portion by said ignition means; and said reversible crank gearing means including first and second shaft gears connected respectively to said first and second body portions for rotation therewith, first and second coaxially disposed rocker shafts journaled on said drive frame means on one side of said crank shaft, first and second rocker gears respectively connected to one end of said first and second rocker shafts and meshed with said first and second shaft gears, first and second crank means rigidly connected respectively to said first and second rocker shafts for movement by said first and second rocker gears, said first and second crank means disposed in diverging relation to each other and having outer terminal ends, and first and second connecting members pivotally connected between the terminal ends of said first and second crank means and said crank portion of the crank shaft, whereby said first and second crank means cooperate to both rotate said crank shaft in the same direction as the first and second pairs of vane means alternately travel in said annular chamber.

8. A rotary internal combustion machine as set forth in claim 7 in which said crank portion and drive frame means simultaneously rotate about the crank shaft axis at different speeds, said first and second rocker gears and crank means connected to rotate in opposite directions upon rotation of one pair of vane means and in reverse opposite directions upon rotation of the other pair of vane means.

9. A rotary internal combustion machine comprising, an outer stationary body having a substantially closed annular chamber; ignition means, exhaust port means, and intake means for supplying a combustible mixture, connected in communication with said annular chamber and circumferentially spaced from each other; a crank shaft including a crank portion, journaled for rotation on said outer stationary body coaxial with said annular chamber; first and second body portions journaled for independent rotation on said crank shaft and having edge portions closing one wall of said annular chamber; first and second pairs of vane means connected alternately in said annular chamber and connected diametrically on said edge portions of said first and second body portions, respectively, for movement in the same direction in an annular path through said chamber; said alternate first and second pairs of vane means forming end walls of compression, expansion, exhaust, and intake chamber portions in said annular chamber; planetary gearing means connected between said outer stationary body and said crank shaft; said planetary gearing means including a substantially rectangular drive frame means rotatably journaled on said crank shaft; reversible crank gearing means journaled on said drive frame means and connected to transfer rotative power from said first and second body portions to said crank portion to rotate said crank shaft and alternately hold one pair of said vane means substantially stationary while the other pair of vane means is moved around said annular chamber to provide four cycle operations upon ignition of said compression chamber portion by said ignition means; said planetary gearing means journaled on said frame on one side of said crank shaft, said reversible crank gearing means journaled on said frame on the opposite side of said crank shaft, and said reversible crank gearing means comprising first and second crank gear trains connected for alternate positive movement by said first and second body portions as said pairs of vanes alternately rotate through said annular chamber and connected for respective alternate movement by said crank portion and frame to alternately maintain said first and second body portions substantially stationary while the opposite body portion rotates.

References Cited

UNITED STATES PATENTS

| 1,628,162 | 5/1927 | Lehnert | 123—11 |
| 1,695,888 | 12/1928 | Dowdey | 123—11 |
| 2,142,706 | 1/1939 | Wolstenholme | 123—11 |
| 2,222,133 | 11/1940 | Wolstenholme | 123—11 |
| 2,349,848 | 5/1944 | Davids | 123—11 |
| 3,301,193 | 1/1967 | Moore | 123—11 |
| 3,356,079 | 12/1967 | Rolfsmeyer | 123—11 |

MARK M. NEWMAN, Primary Examiner

U.S. Cl. X.R.

91—60; 103—129; 230—144